United States Patent [19]
Fujinami

[11] Patent Number: 5,337,086
[45] Date of Patent: Aug. 9, 1994

[54] IMAGE SIGNAL CODING AND DECODING APPARATUS WITH MULTIPLE-PROCESS MOTION COMPENSATION

[75] Inventor: Yasushi Fujinami, Kanagawa, Japan
[73] Assignee: Sony Corporation, Tokyo, Japan
[21] Appl. No.: 956,293
[22] Filed: Oct. 5, 1992
[30] Foreign Application Priority Data
   Oct. 22, 1991 [JP] Japan .................. 3-302503
[51] Int. Cl.$^5$ .................. H04N 7/133; H04N 7/137
[52] U.S. Cl. .................. 348/402; 348/420
[58] Field of Search .................. 358/136, 105, 133; 348/402, 420, 400, 401; H04N 7/137

[56] References Cited

U.S. PATENT DOCUMENTS

| | | |
|---|---|---|
| 4,796,087 | 1/1989 | Guichard et al. |
| 5,006,929 | 4/1991 | Barbero et al. ............ 358/105 |
| 5,021,879 | 6/1991 | Vogel ..................... 358/105 |
| 5,126,841 | 6/1992 | Tanaka et al. |

FOREIGN PATENT DOCUMENTS

| | | |
|---|---|---|
| 0397402 | 11/1990 | European Pat. Off. |
| 0425089 | 5/1991 | European Pat. Off. |

OTHER PUBLICATIONS

IEEE Global Telecommunications Conference & Exhibition, vol. 2, Nov. 28, 1988, Hollywood, Fla., pp. 997–1004, XP94155, R. Plompen et al., Motion Video Coding in CCITT SG XV. The Video Source Coding paragraph 8; Fig. 5.
Systems and Computers in Japan, vol. 21, No. 9, Sep. 1, 1990, New York USA, pp. 24–33, XP220498, H. Tominaga et al., 'A Motion Detection Method on Video Image by Using Hierarchical Pixels', par. 4.4 0 par. 4.5; FIGS. 7–9.
Patent Abstracts of Japan, vol. 13, No. 509 (E-846) Nov. 15, 1989 & JP-A-01 205 667 (NEC Corp.) Aug. 18, 1989.
Patent Abstracts of Japan, vol. 16, No. 291 (E-1224) Jun. 26, 1992 & JP-A-04 074 085 (Matsushita Electric Industrial Co. Ltd.) Mar. 9, 1992.
Patent Abstracts of Japan, vol. 15, No. 185 (E-1066) May 13, 1991 & JP-A-03 046 481 (Kokusai Denshin Denwa Co Ltd. <KDD>) Feb. 27, 1991.
Patent Abstracts of Japan, vol. 16, No. 104 (E-1178) Mar. 13, 1992 & JP-A-03 280 681 (Oki Electric Ind Co Ltd) Dec. 11, 1991.

Primary Examiner—Tommy P. Chin
Assistant Examiner—Bryan S. Tung
Attorney, Agent, or Firm—William S. Frommer; Alvin Sinderbrand

[57] ABSTRACT

Image signal coding and decoding apparatus adapted to reduce the redundancy between motion vectors in divided blocks of an image to realize enhanced data compression. The coding apparatus comprises a local decoder for locally decoding quantized data; a motion detector for calculating the motion vectors of individual subblocks defined by dividing macroblocks for motion compensation of a dynamic image; a controller for selecting an optimal process for the motion vectors to minimize the redundancy; a motion compensator for forming a predictive image; and a difference calculator for calculating the difference between the predictive image and the original image signal corresponding thereto. The image signal decoding apparatus comprises an inverse multiplexer for separating the coded data into variable-length coded data and vector coded data; and a controller for selecting an optimal motion vector process on the basis of the vector coded data.

14 Claims, 8 Drawing Sheets

COEFFICIENTS

A  MOTION COMPENSATION MODE FLAG $\begin{cases} 0: \text{MOTION COMPENSATION PER MB} \\ 1: \text{MOTION COMPENSATION PER SUBBLOCK} \end{cases}$ (ONLY WHEN A=1)

B  SUBBLOCK VECTOR TRANSFER MODE FLAG $\begin{cases} 0: \text{REPRESENTATIVE VALUE MODE} \\ 1: \text{PREDICTIVE VALUE MODE} \end{cases}$

IMAGE SIGNAL CODING AND DECODING APPARATUS WITH MULTIPLE-PROCESS MOTION COMPENSATION

BACKGROUND OF THE INVENTION

1. Field of the Invention

The present invention relates to an image signal coding/decoding apparatus and, more particularly, to a motion vector coder/decoder adapted for use in compression and expansion of motion vector data representing motions of dynamic images.

2. Description of the Prior Art

Figure 8:
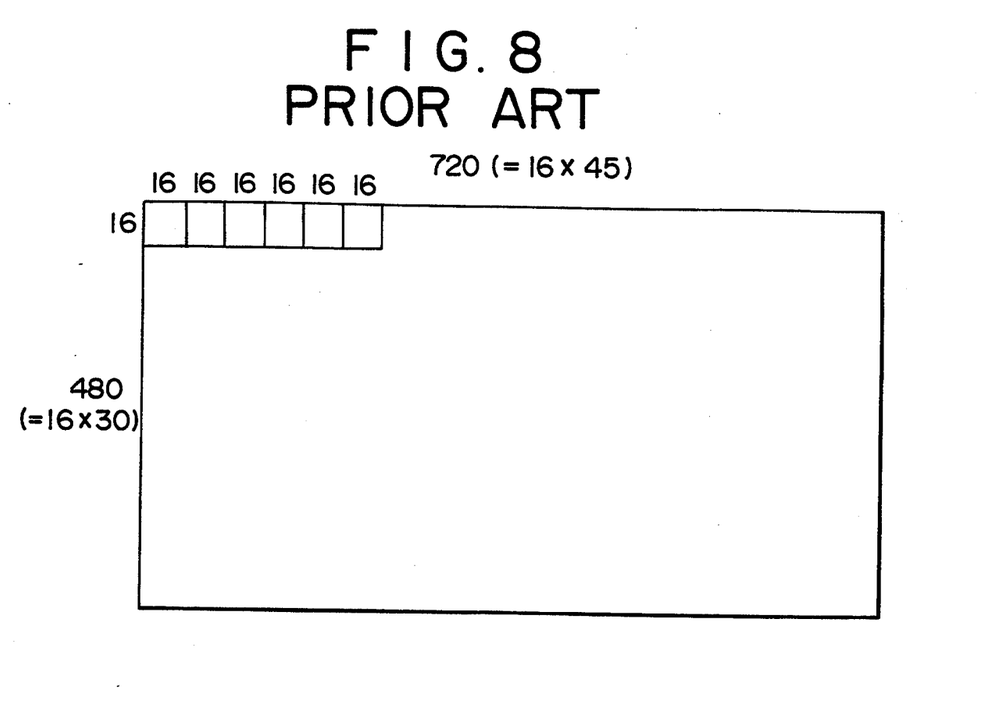
FIG. 8 illustrates a dynamic image divided into macroblocks each composed of 16 pixels×16 lines.
Figure 9:
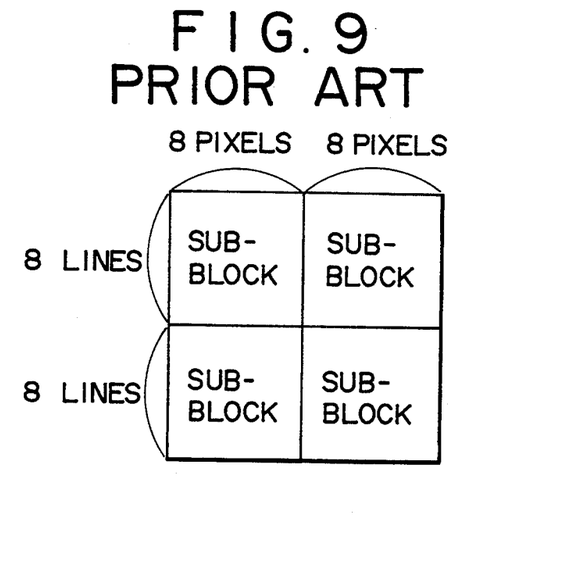
FIG. 9 shows a macroblock which consists of four subblocks each composed of 8 pixels×8 lines.

In a conventional dynamic image compressing/expanding apparatus, a dynamic image composed of, e.g., 720 pixels (horizontal)×480 lines (vertical) as shown in FIG. 8 is divided into macroblocks (MB) each composed of 16 pixels×16 lines. Each macroblock is further divided into four subblocks each composed of 8 pixels×8 lines as shown in FIG. 9, and a motion vector is generated in each of such subblocks.

Figure 10A:
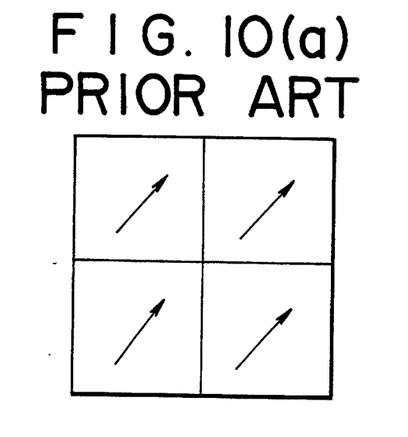
FIGS. 10(a) and 10(b) show motion vectors in subblocks constituting a macroblock.

When there occurs merely little change in the motion of an image, the motion vectors in the individual subblocks constituting the macroblock are substantially equal to one another (as shown in FIG. 10(a)). In such a case, the motion vector in one of the four subblocks constituting the macroblock is applied to the other subblocks and is encoded. More specifically, one motion vector is encoded with regard to one macroblock MB which consists of four subblocks. [Coding per macroblock: MB unit mode.]

Figure 10B:
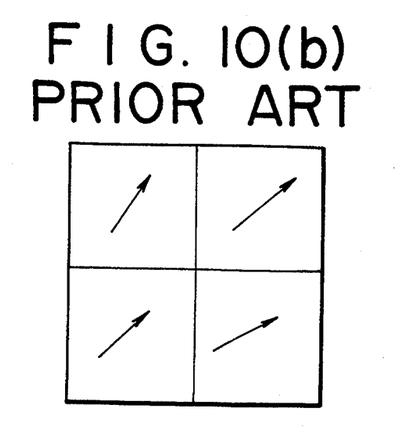

When there exists relatively much change in the motion of the image, the motion vectors in the individual subblocks are different from one another (as shown in FIG. 10(b)). Then the minimum, for example, of the motion vectors in the individual subblocks constituting the macroblock is selected as a representative vector. Then there are encoded the representative vector and the differences between the representative vector and the motion vectors in the subblocks other than the one having the representative vector. In this case, one move vector is encoded with regard to one subblock. [Coding per subblock: Representative value mode].

Figure 11:
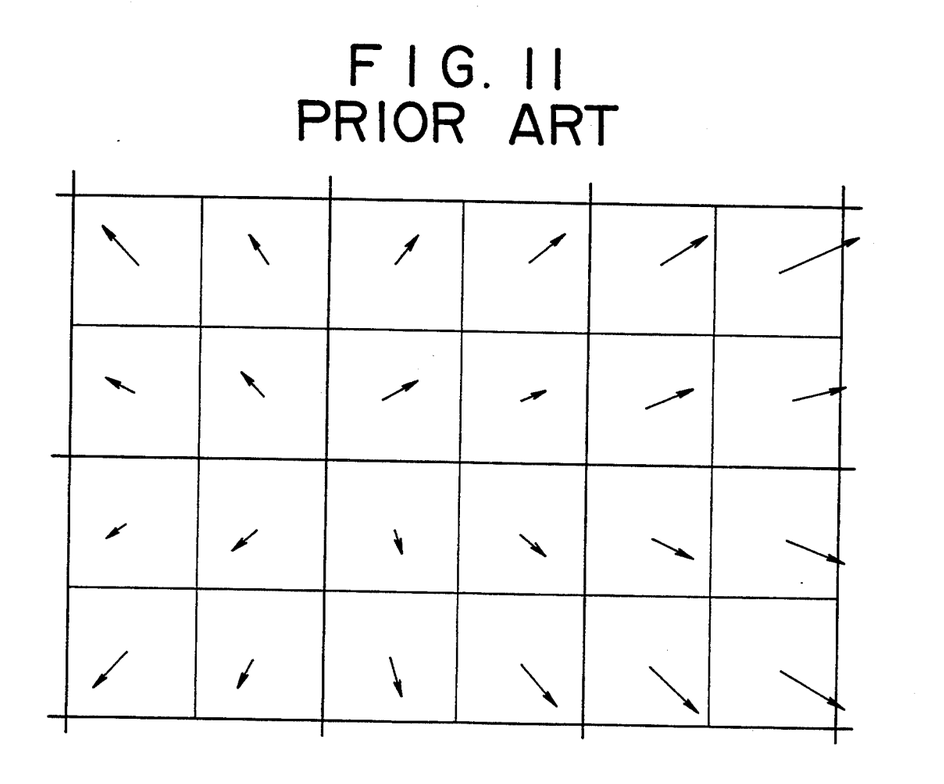
FIG. 11 shows motion vectors in subblocks in a zooming operation.

In such coding per subblock where the difference between the representative vector of the macroblock and the motion vector of each subblock is calculated, the redundancy can be reduced in comparison with the case of encoding the entire data (motion vectors) of the individual subblocks constituting the macroblock, hence compressing the quantity of the data. However, in a zooming operation for example as shown in FIG. 11, there exists correlation between the mutually adjacent macroblocks to consequently raise a problem that some redundancy is still left in the data for calculation of the difference.

OBJECT AND SUMMARY OF THE INVENTION

The present invention has been accomplished in view of the circumstances mentioned. And its object resides in providing an improved apparatus which is capable of further reducing the redundancy of data to realize enhanced compression of the data.

According to one aspect of the present invention, there is provided an image signal coding apparatus for executing orthogonal transformation of an image signal composed of groups of unitary blocks, then quantizing the transformed data, and subsequently coding the data thus quantized. The apparatus comprises a motion detector for locally decoding the quantized data; a vector detector for calculating the vectors of individual subblocks formed by further dividing each of macroblocks for move compensation of a dynamic image; a controller for selecting an optimal process for the motion vectors to minimize the redundancy between the representative motion vector of the current macroblock and the motion vectors of the subblocks in the current macroblock; a motion compensator for forming a predictive image by executing a motion compensation in conformity with the output of the motion detector and the motion vector selected by the controller; and a difference calculator for calculating the difference between the predictive image formed by the motion compensator and the original image signal corresponding to such image.

The controller comprises a motion vector memory means for storing the motion vectors of the subblocks; a representative motion vector memory means for storing the representative motion vector of each macroblock; a motion vector predictive means for predicting the motion vector of each subblock of the current macroblock on the basis of the representative motion vector of each macroblock stored in the memory means; a difference calculator means for calculating the difference between the predicted motion vector of the subblock obtained from the predictive means or the representative motion vector thereof and the actual motion vector of the subblock; and a process selector means for selecting the most efficient one of first, second and third processes. The first process uses the representative motion vector as a motion compensating vector for the current macroblock; the second process uses, as motion compensating vectors, the representative motion vector of the current macroblock and the first difference vector equivalent to the difference between the predicted motion vector obtained from the motion vector predictive means and the motion vector of the subblock corresponding thereto; and the third process uses, as motion compensating vectors, the minimum motion vector of the subblocks in the current macroblock and the second difference vector equivalent to the difference between such minimum motion vector and the other motion vectors.

According to another aspect of the present invention, there is provided an image signal decoding apparatus which comprises an inverse multiplexer for separating the coded data into variable-length coded data and vector coded data; and a controller for selecting, on the basis of the vector coded data, an optimal motion vector process to minimize the redundancy between the representative motion vector of the current macroblock and the motion vector of each subblock in the current macroblock.

The controller employed in such image signal decoding apparatus has the same circuit configuration as that of the foregoing controller in the aforementioned image signal coding apparatus.

Due to the constitution described above, it becomes possible to reduce the redundancy between the motion vectors of the subblocks stored in the memory and the motion vector of the current macroblock to consequently achieve a higher efficiency in coding an image signal with another advantage that realizes complete expansion of the coded data compressed at the enhanced efficiency based on the reduction of the redundancy.

DESCRIPTION OF THE PREFERRED EMBODIMENTS

Figure 1:
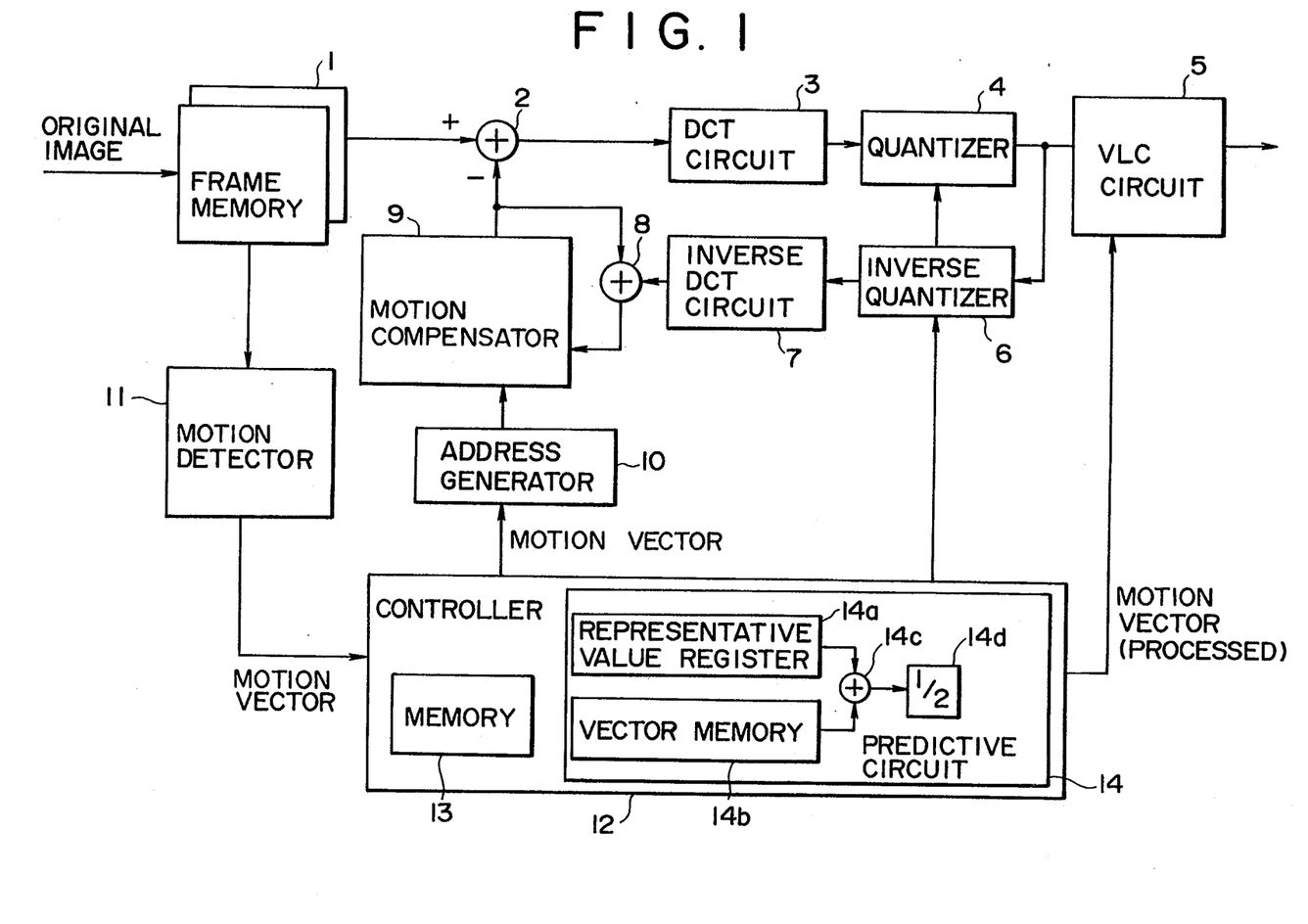
FIG. 1 is a diagram showing an exemplary embodiment of a dynamic image data coding apparatus where a motion vector coder of the present invention is applied.
Figure 2:
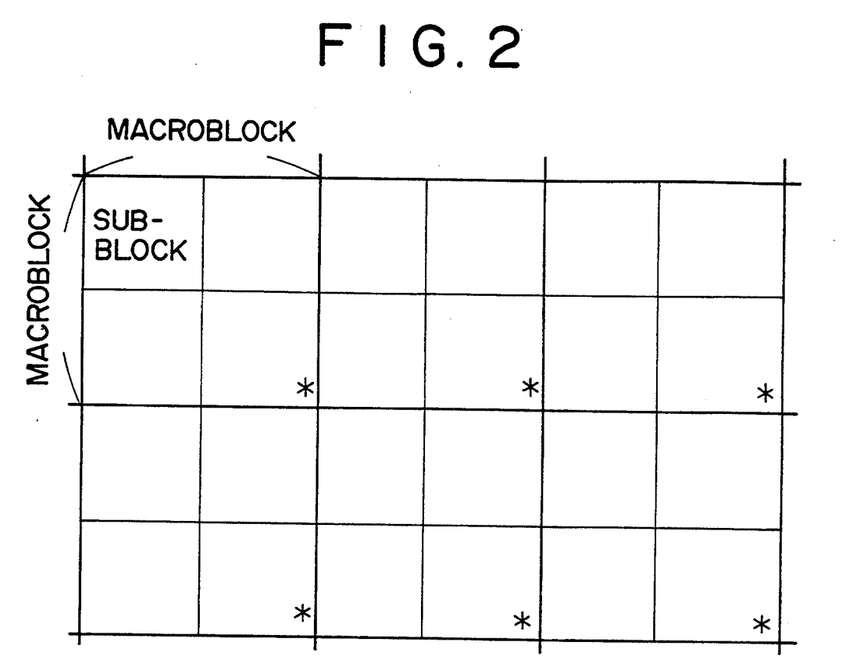
FIG. 2 shows subblocks having motion vectors to be used as representative vectors of macroblocks when predictive vectors of the subblocks are calculated by a predictive circuit 14 in the apparatus of FIG. 1.

FIG. 1 shows the constitution of an exemplary dynamic image data coding apparatus where a motion vector coder of the present invention is applied. In this embodiment, a frame memory 1 stores, block by block as shown in FIG. 2, a digital signal obtained through analog-to-digital conversion of, by an A-D converter (not shown), an image signal outputted from a video camera (not shown) or the like. A calculator 2 calculates the difference between the data read out from the frame memory 1 and the data outputted from a local decoder 9, and a DCT circuit 3 executes a discrete cosine transformation of the input data. A quantizer 4 quantizes the data outputted from the DCT circuit 3, and a VLC circuit 5 converts the quantized output data of the quantizer 4 into a variable length code and multiplexes the same with the data outputted from a controller 12.

An inverse quantizer 6 inversely quantizes the data outputted from the quantizer 4, and an inverse DCT circuit 7 executes an inverse discrete cosine transformation of the data outputted from the inverse quantizer 6.

A motion detector 11 detects the motion of an image in each block stored in the frame memory 1 and supplies the detected motion vector to the controller 12. A predictive circuit 14 incorporated in the controller 12 comprises, similar to a predictive circuit 31 shown in FIG. 6, a representative value register 14a, a vector memory 14b and calculators 14c, 14d. The representative value register 14a temporarily stores, out of the vectors stored in the memory 13, a representative vector which is in the lower right subblock (denoted by a symbol *) in each macroblock which consists of four subblocks as shown in FIG. 2. The vector memory 14b stores the representative vector read out from the register 14a, and the calculator 14c adds the representative vector of the current macroblock, which is stored in the representative value register 14a, to the representative vector of a preceding macroblock (anterior to the current macroblock) stored already in the vector memory 14b. Subsequently the calculator 14d multiplies the output value (vector) of the calculator 14c by $\frac{1}{2}$. Namely, the predictive circuit 14 calculates the average (predictive value) of the representative vector of the current macroblock stored in the representative value register 14a and the representative vector of the preceding macroblock previously stored in the vector memory 14b.

The controller 12 calculates the difference between the predictive vector obtained from the predictive circuit 14 and the vector inputted to the controller 12. Further the controller 12 designates a step size and so forth in each of the quantizer 4 and the inverse quantizer 6 in accordance with the input vector.

An address generator 10 addresses the motion vector supplied thereto from the motion detector 11 via the controller 12 and delivers the addressed motion vector to a motion detector 9. Then, with reference to the address given to the motion vector by the address generator 10, the motion detector 9 performs a motion compensation corresponding to the motion vector relative to the data stored in an incorporated memory (not shown), and supplies the motion-compensated data to the calculators 2 and 8. The calculator 8 adds the output data of the motion detector 9 to the output data of the inverse DCT circuit 7 and then supplies the added data to the memory incorporated in the motion detector 9. Thus, the predictive image data is stored in the memory of the motion detector 9.

Figure 3:
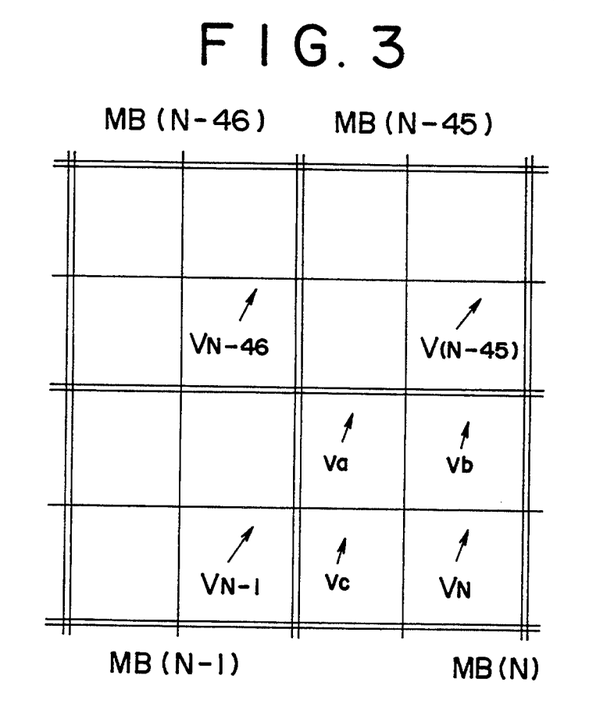
FIG. 3 illustrates how predictive vectors of the subblocks in the current macroblock MB(N) are calculated by the predictive circuit 14 in the apparatus of FIG. 1.

Now an explanation of calculator 2 will be given below with regard to the operation. The image data divided into macroblocks and further into subblocks as shown in FIG. 3 are stored in the frame memory 1 block by block. The data of each subblock thus stored in the frame memory 1 is read out therefrom, and then the difference between such data and the predictive image data outputted from the motion detector 9 is calculated by the calculator 2. Subsequently this difference data is inputted to the DCT circuit 3 where a discrete cosine transformation is executed. The data outputted from the DCT circuit 3 is supplied to the quantizer 4, and then the quantized data therefrom is supplied to the VLC circuit 5.

The output data of the quantizer 4 is inversely quantized by the inverse quantizer 6 and then is supplied to the inverse DCT circuit 7 where an inverse cosine transformation is executed. The data thus transformed (difference data) is added by the calculator 8 to the predictive image data outputted from the motion detector 9, whereby the former image data is regained. Such image data is supplied to and stored in the memory incorporated in the motion detector 9, so as to be used to determine the predictive image data for the image data which is supplied next from the frame memory 1 to the calculator 2.

Meanwhile the motion of the image (motion vector) stored in the frame memory 1 is detected block by block in the motion detector 11, and such motion vector is supplied via the controller 12 to the address generator 10 where an address is given. Then the addressed motion vector is outputted to the local decoder 9. Subsequently with reference to the address given to the motion vector, the motion detector 9 performs a motion compensation corresponding to the motion vector relative to the data stored in the incorporated memory of the motion detector 9, whereby the predictive image data is produced.

The predictive image data of the motion detector 9 is subtracted by the calculator 2 from the output image data of the frame memory 1. A P picture is produced on the basis of the decoded I picture (intracoded image) or the decoded P picture (preceding predictive coded image) positioned temporally anterior as the predictive image (reference image for calculation of the difference). Further a B picture (bidirectional predictive coded image) is produced on the basis of the decoded I picture or P picture positioned temporally posterior or three kinds of interpolated images obtained from both the I and P pictures. The I picture is produced in case merely the data from the frame memory I is supplied to the DCT circuit 3, without utilizing the data obtained from the motion detector 9.

The motion-compensated data inputted from the motion detector 9 is added by the calculator 8 to the data supplied from the inverse DCT circuit 7, whereby an image of the decoded I picture, P picture or B picture is produced and then is supplied to and stored in the memory incorporated in the motion detector 9.

Meanwhile, the motion vector outputted from the motion detector 11 is temporarily stored in the memory 13 of the controller 12. And when the vector stored in the memory 13 is selected by the controller 12 to be the representative vector of the macroblock (i.e., the motion vector in the lower right one of the four subblocks constituting the macroblock), such vector is stored in the representative value register 14a. Upon completion of calculating the aftermentioned predictive value (average) in the predictive circuit 14, the representative vectors of the individual macroblocks stored in the representative value register 14a are sequentially stored in the vector memory 14b.

In the predictive circuit 14, the process of calculating the predictive value is executed in the following procedure. First, as shown in FIG. 3, there are stored in the memory 13 the representative vectors of the four mutually adjacent macroblocks MB such as MB(N-46) at the upper left of the current macroblock MB(N), MB(N-45) above the current macroblock MB(N), subsequently MB(N-1) at the left of the current macroblock MB(N), and then MB(N) in this order. Thereafter, the representative vector VN of the macroblock MB(N) stored last is read out and stored in the representative value register 14a. Subsequently in the predictive circuit 14, there are calculated the respective averages of representative vector VN and the other representative vectors VN-46, VN-45 and VN-1 of the macroblocks MB(N-46), MB(N-45) and MB(N-1) stored previously in the vector memory 14b.

In the controller 12, the average of the representative vector VN of MB(N) and the representative vector VN-46 of MB(N-46) is determined to be the predictive value (predictive vector) of the subblock located between the two subblocks relative to such representative vectors, and the difference between the predictive value thus obtained and the actual vector of the subblock is calculated and outputted. More specifically, the difference between the vector Va and the average of the representative vector VN of MB(N) and the representative vector VN-46 of MB(N-46) is outputted as a motion vector of the subblock having the vector Va (i.e., the subblock located between the lower right subblock of the macroblock MB(N-46) and the lower right subblock of the current macroblock MB(N). Similarly, the difference between the vector Vb and the average of the representative vector VN of MB(N) and the representative vector VN-45 of MB(N-45) is outputted as a motion vector of the subblock having the vector Vb (i.e., the subblock located between the lower right subblock of the macroblock MB(N-45) and the lower right subblock of the current macroblock MB(N). And further the difference between the vector Vc and the average of the representative vector VN of MB(N) and the average vector VN-1 of MB(N-1) is outputted as a motion vector of the subblock having the vector Vc (i.e., the subblock located between the lower right subblock of the macroblock MB(N-1) and the lower right subblock of the current macroblock MB(N)). In the manner mentioned, difference vectors equivalent to the differences between the above-described averages (predictive vectors) and the three motion vectors Va, Vb, Vc of the current macroblock MB(N) are calculated, and then the representative vector VN of MB(N) is stored in the vector memory 14b.

In the VLC circuit 5, the three difference vectors calculated with respect to the individual macroblocks and the representative vectors of such macroblocks are multiplexed with the corresponding picture data (I, P or B picture) as the motion compensating vectors for the I, P or B picture quantized by the quantizer 6.

Due to the process mentioned, the data stored in the memory of the local decoder 9 correspond to the image formed by decoding the data outputted from the VLC circuit 5, so that it is possible to obtain the data of the P picture or the B picture sequentially by utilizing the data stored in the memory of the local decoder 9.

Figure 4:
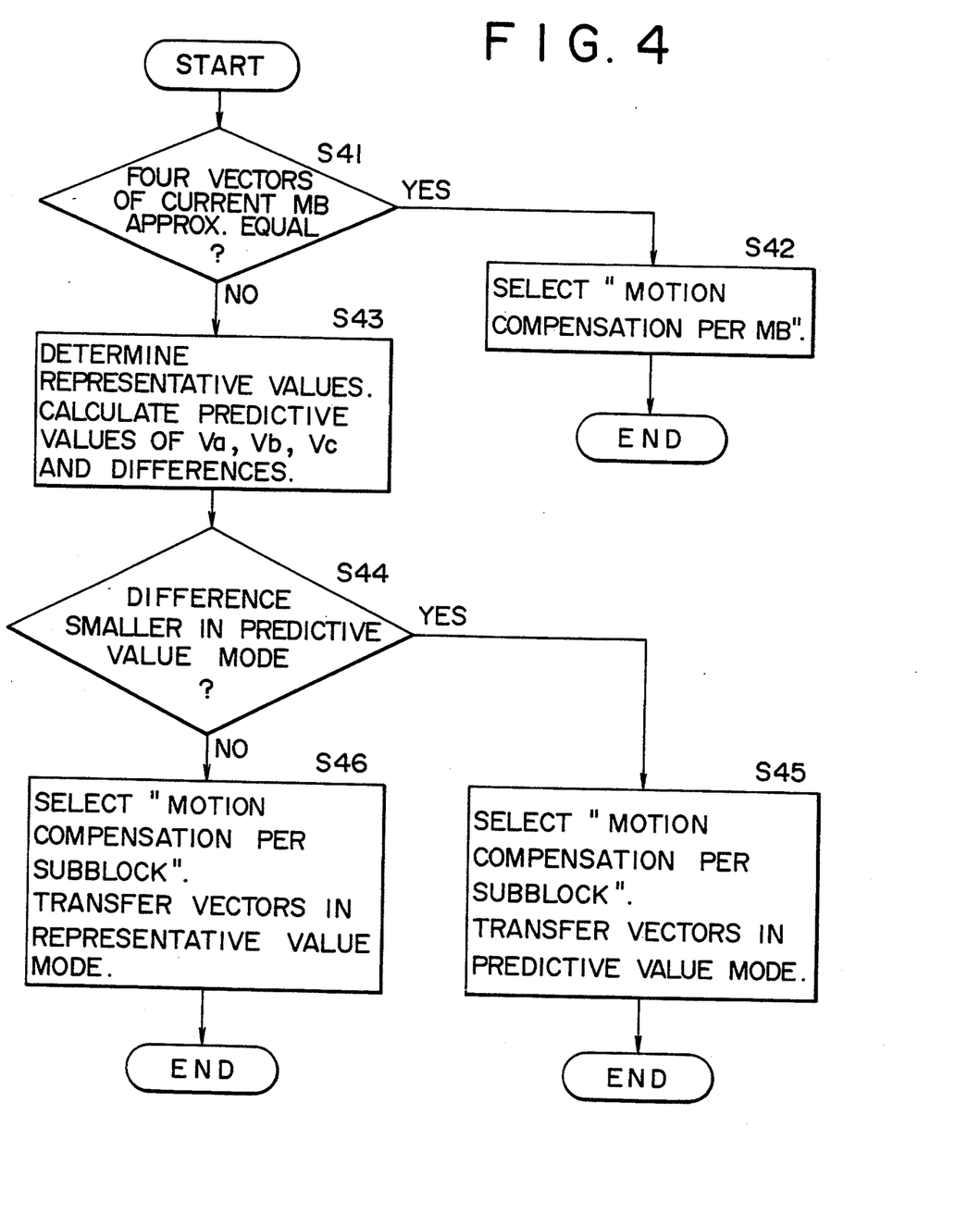
FIG. 4 is a flow chart for explaining an algorithm to determine an optimal coding mode by a controller 12 employed in the apparatus of FIG. 1.

Hereinafter the procedure of processing the motion vectors in the controller 12 will be described with reference to the flow chart of FIG. 4. First at step S41, the motion vectors of four subblocks constituting the macroblock (current MB) to be encoded now are compared with one another. If the result of such comparison at step S41 signifies that the vectors of the four subblocks constituting the current MB are approximately equal to one another (i.e., any difference between the individual vectors is smaller than the predetermined reference value), the operation proceeds to step S42 where the vector of one of the four subblocks constituting the current MB (in the example of FIG. 3, the lower right one of the macroblock) is selected as the motion vector of the macroblock. The motion vector thus selected is multiplexed in the VLC circuit 5 to serve as a motion compensating vector for the current MB. [MB unit mode].

If the result of the comparison at step S41 signifies that the vectors of the four subblocks constituting the current MB are mutually different (i.e., any difference between any two of the individual vectors is greater than the predetermined reference value), the operation proceeds to step S43 for calculating the respective differences between the minimum of vector of the vectors representing the four subblocks constituting the current MB and the vectors values of the remaining. Also the difference vectors are calculated from the predictive vectors of the current MB calculated by the predictive circuit 14 as described above. Subsequently at step S44, the three difference vectors equivalent to the respective differences between the minimum vector of the vectors representing the four subblocks constituting the current MB and the remaining vectors are compared with the three difference vectors calculated from the predictive vectors of the current MB. And if the result of such comparison at step S44 signifies that the data quantity of the three difference vectors calculated from the predictive vectors of the current MB is smaller, the operation proceeds to step S45 where, in the VLC circuit 5, these three difference vectors and the motion vector (representative vector) of the lower right one of the four subblocks constituting the current MB are multiplexed to serve as motion compensating vectors for the individual subblocks.

Predictive value mode

When the result of the comparison at step S44 signifies that the three difference vectors equivalent to the respective differences between the minimum vector of the vectors representing the four subblocks constituting the current MB and the remaining vectors are smaller, the operation proceeds to step S46 where, in the VLC circuit 5, the minimum vector of the current MB and the three difference vectors thereof are multiplexed to serve as motion compensating vectors for the individual subblocks. [Representative value mode].

As described above, the redundancy between the individual subblocks of the macroblock is so low as to enable coding by the MB unit mode. In case some redundancy is left between the macroblocks in execution of coding by the representative value mode, the predictive value mode is selectively employed to reduce the redundancy between the macroblocks, hence attaining high compression of the data.

Figure 5:
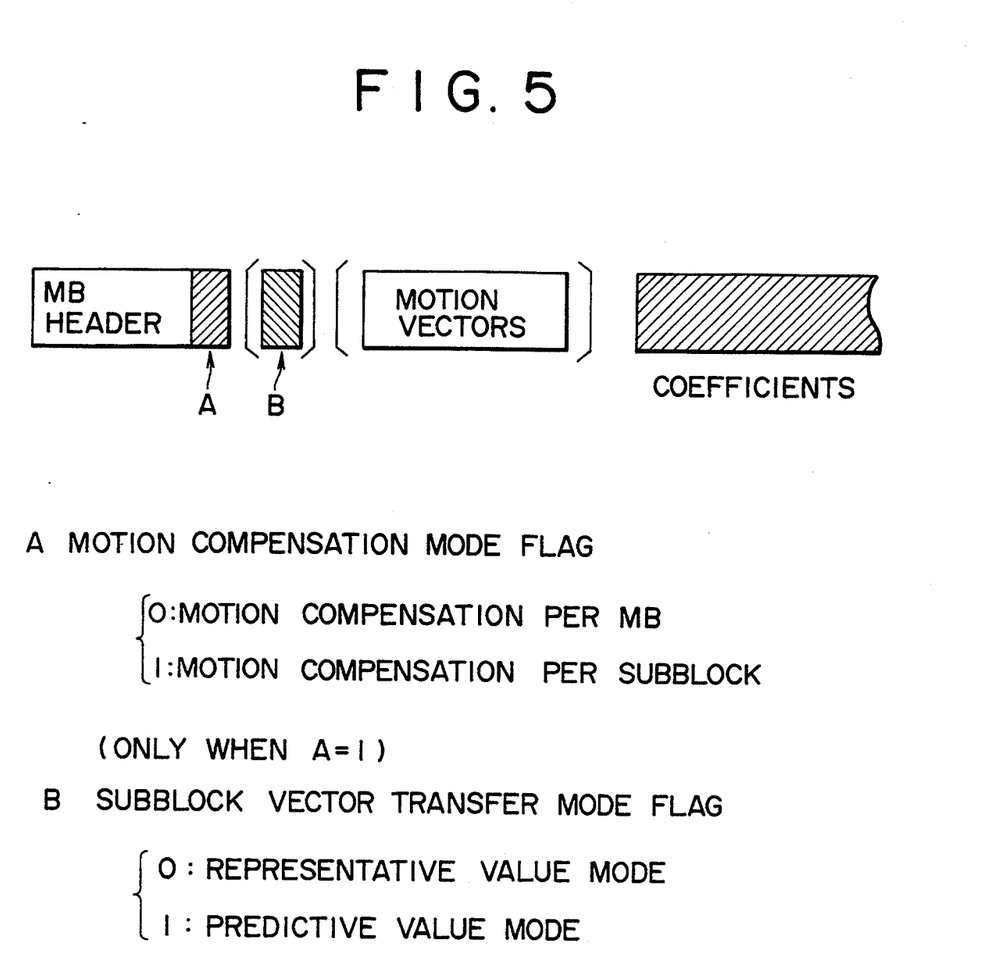
FIG. 5 shows a format of the data outputted from a VLC circuit 5 in the apparatus of FIG. 1.

FIG. 5 shows the format of the data multiplexed in the VLC circuit 5. An MB header comprises addresses and so forth of the macroblocks MB, and a motion compensation mode flag (denoted by a variable A) becomes "0" for example when the motion compensation is performed per macroblock MB, or becomes "1" for example when such compensation is performed per subblock. In case the motion compensation is performed per subblock (with the motion compensation mode flag "1") by the predictive value mode, a subblock vector transfer mode flag (denoted by a variable B) becomes "1" for example. Meanwhile, in case the motion compensation is performed per subblock (with the motion compensation mode flag "1") by the representative value mode, the subblock vector transfer mode flag becomes "0" for example. And in succession to the subblock vector transfer mode flag, there are additionally affixed the motion vector corresponding to the motion compensation mode flag and the subblock vector transfer mode flag, and also coefficients of the data processed through the discrete cosine transformation and outputted from the DCT circuit 3 via the quantizer 4.

Figure 6:
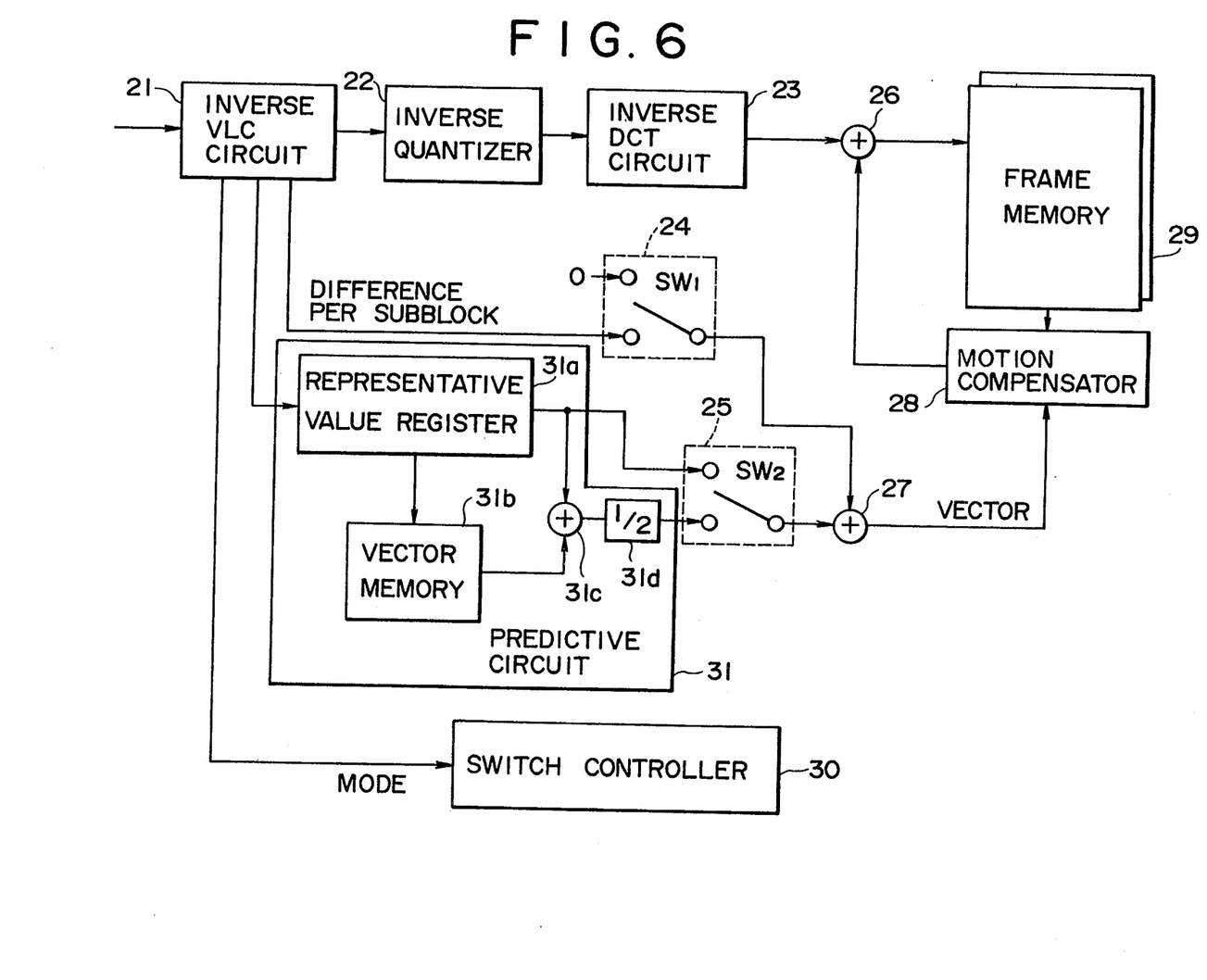
FIG. 6 is a diagram showing an exemplary embodiment of a motion vector decoder for decoding the data encoded by the apparatus of FIG. 1.

FIG. 6 shows the constitution of an exemplary vector decoding apparatus used to decode the data encoded in the aforementioned data format. In this embodiment, an inverse VLC circuit 21 processes the input data by inverse variable length coding, and an inverse quantizer 22 executes inverse quantization of the data outputted from the inverse VLC circuit 21. An inverse DCT circuit 23 executes inverse discrete cosine transformation of the data outputted from the inverse quantizer 22 and delivers the transformed data to a calculator 26.

Subsequently the calculator 26 adds the output data of the inverse quantizer 22 to the output data of a move compensator 28 and delivers the added data to a frame memory 29, which then stores the data outputted from the calculator 26.

A switch controller 30 controls a first switch 24 (SW1) and a second switch 25 (SW2) in conformity with the motion compensation mode flag or the subblock vector transfer mode flag outputted from the inverse VLC circuit 21. The first switch 24 is controlled by the switch controller 30 to select either a zero (no signal), or to select the difference vector outputted from the inverse VLC circuit 21 which represents either the representative value mode or the predictive value mode and then first switch 24 delivers the selected data to the calculator 27. Meanwhile the second switch 25 either selects a motion vector representing a macroblock encoded by the MB unit mode and stored in a representative value register 31a which comprises a predictive circuit 31 in combination with a vector memory 31b and calculators 31c, 31d, or second switch 25 selects either the minimum of the motion vectors of the MB-subblocks constituting a macroblock corresponding to the representative vectors obtained by either the representative value mode, or the predictive vector outputted from the calculator 31d of the predictive circuit 31. The data thus selected is delivered to the calculator 27.

The calculator 27 adds the data (vectors) outputted from the two switches 24 and 25. Subsequently a motion compensator 28 executes, in accordance with the output vector of the calculator 27, a motion compensation for the data stored in a frame memory 29, and then delivers the motion-compensated data to a calculator 26.

Figure 7:
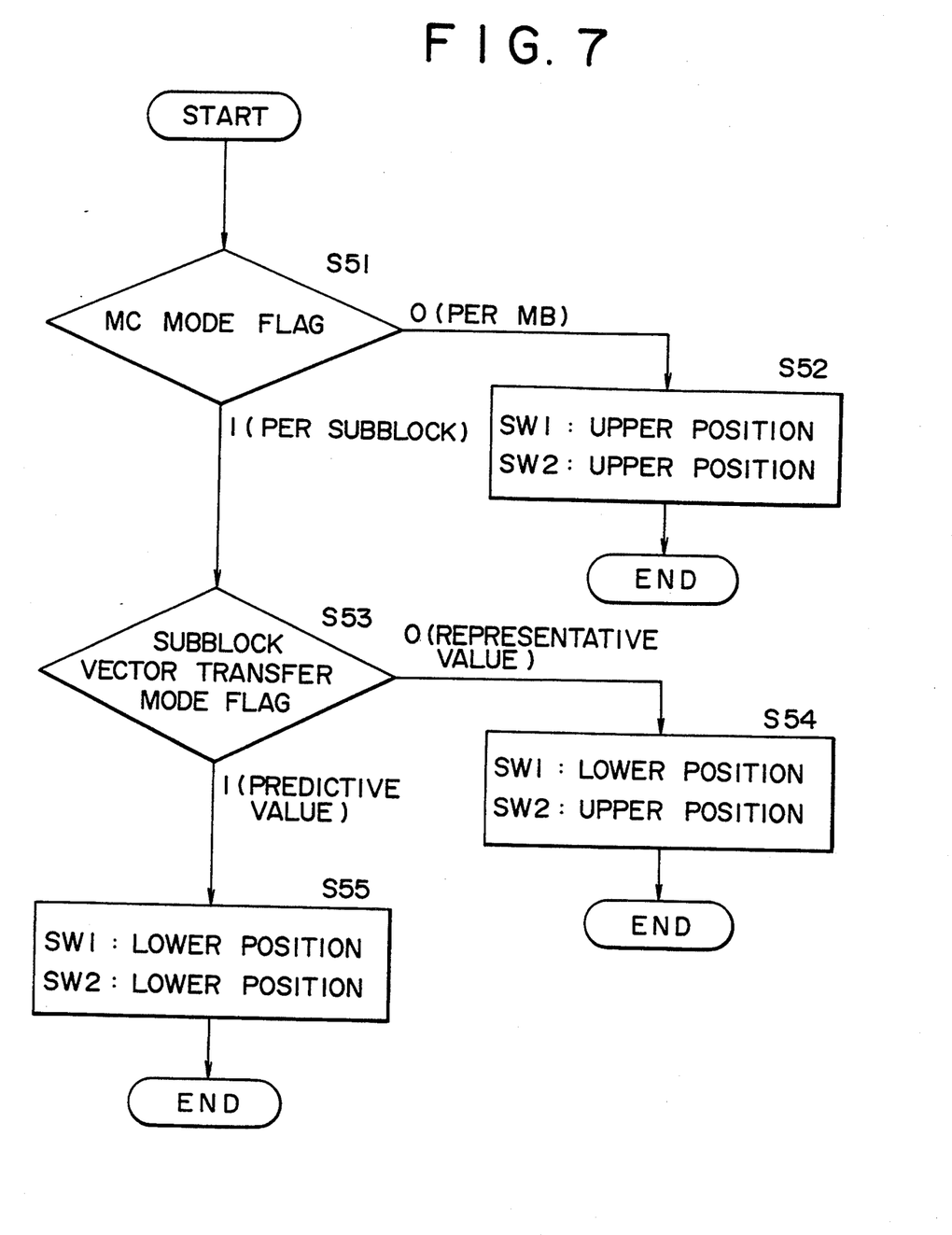
FIG. 7 is a flow chart for explaining an algorithm to control switches 24 and 25 by a switch controller 30 employed in FIG. 6.

Now the operation of such decoding apparatus will be described below with reference to the flow chart of FIG. 7. First a decision is made at step S51 with regard to the motion compensation mode flag outputted from the inverse VLC circuit 21 and supplied to the switch controller 30. If the result of the decision signifies that the motion compensation mode (MC) flag is equal to "0" i e the data to be decoded is the one encoded by the MB unit mode, the operation proceeds to step S52 where the switches 24 and 25 are set to the upper positions thereof. In this case, the MB-representing motion vector outputted from the inverse VLC circuit 21 is stored in the representative value register 31a. Since the switch 24 is set to its upper position, a zero indicative of no signal is delivered therefrom. Meanwhile from the switch 25 set also to its upper position, there is delivered the MB motion vector stored in the representative value register 31a. Accordingly, the zero and the MB motion vector stored in the representative value register are added to each other by the calculator 27. Namely, the MB motion vector stored in the representative value register is outputted without any change from the calculator 27 to the motion compensator 28.

If the result of the decision at step S51 signifies that the motion compensation mode (MC) flag is equal to "1", the operation proceeds to step S53 for making another decision with regard to the subblock vector transfer mode flag outputted from the inverse VLC circuit 21. When the result of such decision signifies that the subblock vector transfer mode flag is equal to "0" i.e., the data to be decoded is the one encoded by the representative value mode, the operation proceeds to step S54 where the first switch 24 is set to the lower position while the second switch 25 is set to the upper position. In this case, the minimum vector of the macroblock outputted from the inverse VLC circuit 21 is stored in the representative value register 31a. Since the first switch 24 is set to the lower position, the difference vectors of the individual subblocks of the macroblock based on the representative value mode are outputted therefrom. Meanwhile from the second switch 25 set to the upper position, there is outputted the minimum vector of the macroblock stored in the representative value register 31a. Accordingly the difference vectors equivalent to the differences between the minimum vector of the macroblock and the other vectors thereof are added to the minimum vector of the macroblock by the calculator 27. Namely, the motion vectors of the individual subblocks of the macroblock are decoded in the calculator 27 and are outputted therefrom to the motion compensator 28.

In case the result of the decision at step S53 signifies that the subblock vector transfer mode flag is equal to "1" i.e., the data to be decoded is the one encoded by the predictive value mode, the operation proceeds to step S55 where the switches 24 and 25 are both set to the lower positions thereof. In this case, the vectors of the lower right subblocks of the macroblocks outputted from the inverse VLC circuit 21 are stored in the representative value register 31a. Since the first switch 24 is set to its lower position, the difference vectors of the individual subblocks of the macroblock based on the predictive value mode are outputted therefrom. Meanwhile from the second switch 25 set to its lower position, there are outputted the predictive vectors calculated by the predictive circuit 31. (This operation is the same as that in the aforementioned case of the predictive circuit 14 in the coding apparatus of FIG. 1.) Therefore the difference vectors equivalent to the differences between the predictive vector and the motion vectors other than the representative vector of the macroblock are added to the predictive vector by the calculator 27. Namely, the motion vectors of the individual subblocks of the macroblock are decoded by the calculator 27 and then are outputted therefrom to the move compensator 28.

Meanwhile the image data outputted from the inverse VLC circuit 21 is inversely quantized in the inverse quantizer 22 and then is supplied to the inverse DCT circuit 23, where the data is processed through an inverse discrete cosine transformation. When the data thus transformed is the I-picture data, it is supplied without any change via the calculator 26 to the frame memory 29 and is stored therein. In case the data outputted from the inverse DCT circuit 24 is the P-picture data based on the predictive image of I or P picture, the I- or P-picture data is read out from the frame memory 29 and then is supplied to the move compensator 28 where a move compensation is executed correspondingly to the motion vector outputted from the calculator 27. Subsequently the motion-compensated data is supplied to the calculator 26 where the output data of the inverse DCT circuit 23 is added to the output data of the move compensator 28 to thereby generate P-picture data, which is then stored also in the frame memory 29.

When the B-picture data is outputted from the inverse DCT circuit 23, the I-picture or P-picture data is read out from the frame memory 29 and then is supplied to the motion compensator 28 where a motion compensation is executed correspondingly to the motion vector outputted from the calculator 27. Subsequently the motion-compensated data is supplied to the calculator 26 where the output data of the inverse DCT circuit 23 is added to the output data of the motion compensator 28 to thereby generate the decoded B-picture data, which is then stored also in the frame memory 29.

The data thus stored in the frame memory 29 are supplied to a D-A converter (not shown) where digital-to-analog conversion of the data is executed, and the converted data are further supplied to a cathode-ray tube (not shown) or the like so as to be displayed.

In the manner described above, the highly compressed data can be decoded in conformity with the redundancy thereof.

In the embodiment mentioned, the motion vector in the lower right subblock of each macroblock is selectively adopted as a representative vector in the predictive value mode. Such adoption is based on the fact that the scanning in a video camera and a cathode-ray tube is generally performed rightward from the left and downward from the top. More specifically, before completion of the scanning on the representative vector VN of the current macroblock MB(N) as shown in FIG. 3, it is necessary, for calculating the predictive values of the vectors Va, Vb, Vc in the other subblocks of the current macroblock MB(N), to complete the scanning on the representative vectors VN-46, VN-45 and VN-1 of the other preceding macroblocks MB(N-46), MB(N-45) and MB (N-1). Therefore, it is preferred that the subblock having the motion vector to be selected as the representative vector by the predictive value mode is the last one of the individual subblocks of the macroblock with respect to the scanning order in the video camera and the cathode-ray tube.

According to the image signal coding apparatus of the present invention, as described hereinabove, it is possible to reduce the redundancy between the motion vectors of the stored subblocks and the motion vector of the current macroblock to consequently achieve an enhanced coding efficiency in compressing the motion vectors.

And according to the image signal decoding apparatus of the present invention, it is possible to expand the motion vectors compressed at a high efficiency with reduction of the redundancy.

What is claimed is:

1. An image signal coding apparatus for executing orthogonal transformation of an image signal composed of groups of unitary macroblocks each formed of subblocks, then quantizing the transformed data, and subsequently coding the data thus quantized, said apparatus comprising:

inverse means for decoding and inversely quantizing said quantized data;

motion detector means for calculating actual motion vectors of individual subblocks of said macroblocks for motion compensation of a dynamic image;

motion vector generating means for generating a representative motion vector of a current macroblock by selecting the actual motion vectors of one of said subblocks;

motion vector predictive means for determining a predicted motion vector for each of the remaining subblocks of the current macroblock, said predicted motion vector being derived from said representative motion vector of the current macroblock and from a representative motion vector of an adjacent macroblock;

first difference calculator means for calculating the difference between the predicted motion vector of each subblock obtained from said predictive means and the actual motion vector of each subblock of the current macroblock, thereby forming difference vectors;

motion compensator means for forming a predictive image by executing a motion compensation in conformity with an output of said inverse means, said representative motion vector and said difference vectors;

second difference calculator means for calculating the difference between the predictive image formed by said motion compensator means and the original image signal corresponding to said predictive image; and multiplexer means for multiplexing at least said quantized data, said difference vectors and said representative motion vector of the current macroblock.

2. An image signal coding apparatus for executing orthogonal transformation of an image signal composed of groups of unitary macroblocks each formed of subblocks, then quantizing the transformed data, and subsequently coding the data thus quantized, said apparatus comprising:

inverse means for decoding and inversely quantizing said quantized data;

motion detector means for calculating actual motion vectors of individual subblocks for motion compensation of a dynamic image;

controller means for selecting an optimal process for determining motion compensating vectors to minimize redundancy between a representative motion vector representing a subblock of a current macroblock and difference vectors related to the remaining subblocks in said current macroblock, said process being selected such that minimized values for said motion compensating vectors are determined;

motion compensator means for forming a predictive image by executing a motion compensation in conformity with an output of said inverse means and the motion compensating vectors selected by said controller; and first difference calculator means for calculating the difference between the predictive image formed by said motion compensator means and an original image signal corresponding to said predictive image;

wherein said controller means comprises:

motion vector memory means for storing the actual motion vectors of said subblocks of the current macroblock;

representative motion vector memory means for storing a representative motion vector of at least one macroblock adjoining said current macroblock;

motion vector predictive means for calculating a predicted motion vector of each of said subblocks of the current macroblock as derived from the representative motion vector of the current macroblock and the representative motion vector of one of said adjoining macroblocks stored in said representative motion vector memory means;

second difference calculator means for calculating the difference between the predicted motion vector of each subblock in the current macroblock obtained from said motion vector predictive means and the actual motion vector of said each subblock, thereby forming first difference vectors; and process selector means for selecting the most efficient one of a first, second or third process, the first process using said representative motion vector as a motion compensating vector for each subblock of the current macroblock; the second process using, as motion compensating vectors, the representative motion vector of the current macroblock and the first difference vectors obtained from said first difference calculator means; the third process using, as motion compensating vectors, a minimum motion vector of the actual motion vectors of the subblocks in the current macroblock and second difference vectors equivalent to the difference between said minimum motion vector and actual motion vectors of said subblocks not having the minimum motion vector.

3. The image signal coding apparatus according to claim 2, wherein said process selector means comprises:

first decision means for determining whether a third difference vector, which is equivalent to the difference between any two of the actual motion vectors of the subblocks in said current macroblock, is of greater value or of smaller value than a predetermined reference value; and second decision means for determining, when said first decision means determines that the third difference vector is greater than said reference value, whether said second difference vector is of greater value or of smaller value than said first difference vector;

wherein the first process is selected when said first decision means determines that said third difference vector is smaller than said reference value, the second process is selected when said second decision means determines that said first difference vector is of smaller value than said second difference vector, and the third process is selected when said second decision means determines that said first difference vector is of greater value than said second difference vector.

4. The image signal coding apparatus according to claim 3, further comprising multiplexing means for multiplexing the quantized data and the motion compensating vector data selected by said process selector means.

5. The image signal coding apparatus according to claim 4, wherein said multiplexing means further multiplexes mode information indicative of the process selected by said process selector means.

6. The image signal coding apparatus according to claim 2, wherein said inverse means comprises an inverse quantizer for inversely quantizing the quantized data; and an inverse orthogonal transformer for executing an inverse orthogonal transformation of the inversely quantized data.

7. The image signal coding apparatus according to claim 2, wherein said representative motion vector is the motion vector of the subblock scanned last in a temporal scanning sequence of subblocks.

8. The image signal coding apparatus according to claim 2, wherein said predicted motion vector has a value which is the average of the representative motion vector of said current macroblock and of a representative motion vector of a temporally preceding adjacent macroblock.

9. The image signal decoding apparatus for decoding coded data representing groups of unitary macroblocks, each macroblock being formed of subblocks, said apparatus comprising:

inverse multiplexer means for separating the coded data into variable-length coded data and motion vector coded data, said motion vector coded data being comprised of representative motion vectors and difference vectors;

motion vector predictive means for determining a predicted motion vector of the subblocks of a current macroblock, said predicted motion vector being derived from a representative motion vector of the current macroblock and a representative motion vector of an adjacent macroblock;

means for generating an actual motion vector of each subblock of the current macroblock derived from the predicted motion vector of said each subblock and from the difference vector of said each subblock;

decoder means for decoding said variable-length coded data of each subblock of the current macroblock to obtain difference image data; and decoded image generator means for determining a predictive image through motion compensation of said difference image data in response to said actual motion vectors of each said subblock of the current macroblock thereby generating a decoded image.

10. An image signal decoding apparatus for decoding coded data representing groups of unitary macroblocks, each macroblock being formed of subblocks, said apparatus comprising:

inverse multiplexer means for separating the coded data into variable-length coded data and motion vector coded data, said motion vector coded data being comprised of representative motion vectors and difference vectors; and controller means for selecting, in response to a potion of said motion vector coded data, a process for producing motion compensating vectors representing subblocks in a current macroblock;

wherein said controller means comprises:

first vector memory means for storing the representative motion vectors of said current macroblock;

second vector memory means for storing representative motion vectors of macroblocks adjoining said current macroblock;

motion vector predictive means for determining a predicted motion vector of said subblocks of the current macroblock as derived from the representative motion vector of the current macroblock stored in said first vector memory means and the representative motion vector of one of said adjoining macroblocks stored in said second vector memory means;

calculator means for calculating an actual motion vector of each of said subblocks as derived from said difference vector corresponding to said subblock and from said predicted motion vector corresponding to said subblock; and process selector means for selecting one of a first, second or third process in response to said portion of said vector coded data to form said motion compensating vectors; the first process using said representative motion vector as said motion compensating vector for each subblock of the current macroblock; the second process using, as said motion compensating vectors, the representative motion vector of the current macroblock and the actual motion vectors obtained from said calculator means for said current macroblock; the third process using, as said motion compensating vectors, a sum of a minimum motion vector of the subblocks in the current macroblock and a respective one of said difference vectors.

11. The image signal decoding apparatus according to claim 10, further comprising:

decoder means for decoding said variable-length coded data to obtain difference image data; and decoded image generator means for producing a predictive image through execution of a motion compensation in response to the motion compensating vectors selected by said controller means, and for generating a decoded image on the basis of said predictive image and said difference image data.

12. The image signal decoding apparatus according to claim 11, wherein said decoder means comprises:

inverse variable-length coding means for executing inverse variable-length coding of said variable-length coded data;

inverse quantizer means for inversely quantizing said inverse-length coded data; and inverse orthogonal transformer means for executing inverse orthogonal transformation of the inversely quantized data.

13. The image signal decoding apparatus according to claim 10, wherein said representative motion vector of one of said macroblocks is the actual motion vector of said subblock scanned last in a temporal scanning sequence of subblocks.

14. The image signal decoding apparatus according to claim 10, wherein said predicted motion vector has a value which is the average of the representative motion vector of said current macroblock and of a representative motion vector of a temporally preceding adjacent macroblock.

* * * * *